United States Patent [19]

Weber et al.

[11] 3,970,601
[45] July 20, 1976

[54] COLORED POLY (URETHANE) UREA POWDERS

[75] Inventors: Karl-Arnold Weber, Leverkusen, Germany; Helmut Reiff, New Martinsville, W. Va.; Dieter Dieterich, Leverkusen, Germany

[73] Assignee: Bayer Aktiengesellschaft, Leverkusen, Germany

[22] Filed: May 1, 1975

[21] Appl. No.: 573,491

[30] Foreign Application Priority Data

May 28, 1974 Germany............................ 2425810

[52] U.S. Cl. .......................... 260/77.5 Q; 8/178 E; 260/77.5 AM; 260/77.5 AP; 260/77.5 MA; 260/858; 427/195; 427/358; 428/425
[51] Int. Cl.² ........................................ C08G 18/00
[58] Field of Search ............... 8/178 E; 260/77.5 Q, 260/77.5 AM, 858, 77.5 AP, 77.5 MA; 427/195, 358; 428/425

[56] References Cited
UNITED STATES PATENTS

| | | | |
|---|---|---|---|
| 3,012,987 | 12/1961 | Ansul................................. | 260/858 |
| 3,137,671 | 6/1964 | Bosshard et al. .................. | 260/858 |
| 3,180,853 | 4/1965 | Peters................................. | 8/178 E |
| 3,745,041 | 6/1973 | Raymond............................ | 427/358 |
| 3,868,350 | 2/1975 | Reiff et al. ........................ | 260/77.5 Q |
| 3,880,797 | 4/1975 | Maeda et al................ | 260/77.5 AM |

*Primary Examiner*—M. J. Welsh
*Attorney, Agent, or Firm*—Lawrence S. Pope; Gene Harsh

[57] ABSTRACT

The instant invention relates to thermoplastic polyurea powders, optionally containing urethane groups, characterized by a. a smooth, substantially spherical or lenticular surface,
b. an average particle diameter of 5 to 1,000$\mu$, preferably 10 to 200$\mu$,
c. a urea group content, and, optionally, a urethane group content, of 8 to 30% by weight,
d. an ionic group content of 0.01–0.15 milliequivalents per gram of solids, preferably 0.02–0.1 milliequivalent per gram and
e. 0.1 to 10% by weight, preferably 0.2 to 5% by weight, of an organic dye incorporated in the polymer molecule by way of at least one urethane and/or urea group, and the process of manufacture thereof.

5 Claims, No Drawings

COLORED POLY (URETHANE) UREA POWDERS

BACKGROUND OF THE INVENTION

Natural and synthetic polymers are rarely used (especially in the field of textiles) in their original color. The coloring of the polymers is carried out not only for the sake of their appearance but also for other purposes, for example, to improve the stability of the polymers to light by incorporating $TiO_2$, optionally mixed with other light protective agents and other substances.

Polymers, for example in the form of fibers or textiles, employed in the textile industry may be colored by various methods. Dyeing and printing processes which employ soluble dyes are known, e.g. direct dyes for cellulose fibers, acid dyes for wool, basic dyes for polyacrylonitrile, and the like. Another method consists of dyeing and printing using pigments which are applied to the surface of polyester fibers, for example, in the form of dispersions, and which diffuse into the fibers and dissolve in them. Direct incorporation of dyes in the fibers by spinning is also known. Dyeing and printing textiles can also be carried out by pigment dyeing and pigment printing processes using binders. In these cases, the binder binds the pigment to the surface of the fiber or textile.

For practical reasons, the number of processes commonly employed for coloring polymers which are used as coating agents is much smaller than those employed for coloring and printing the textiles themselves.

For coloring coating compounds for textiles it is most common to use color pigments which are generally insoluble in the polymers. Thus, for example, in polyurethane coating compounds it is preferred to use color pigments of either organic or inorganic origin. The color yield depends on the particle size of the color pigments. The larger the surface area of the pigments, that is to say the more finely divided the pigment, the greater is the color yield.

Since it is extremely difficult to obtain pigments of reproducible particle size by mechanical methods using bar looms and therefore more difficult to form patterns, it has become customary in some cases to work up the pigments in large batches and to control the particle size by coating the small particles of pigment with a coating resin. This prevents the finely divided pigments from reagglomerating. The disadvantage of this method is that when preparing the pigment paste the coating resin must always be compatible with the polymer with which the pigment is to be covered.

The use of purely inorganic or organic color pigments has also some other disadvantages. Inorganic pigments often have a rather low intensity color and the range of shades is relatively restricted. Organic pigments provide a wide choice of intensive and brillant shades, but they tend to migrate under the action of heat and sometimes even to sublimate. This tendency is increased by, among other things, finishing the surface with silicons.

The dyeability of polyurethane coating compounds also depends on the system. For one and two component polyurethanes, the solid substance which is applied as a solution in an organic solvent can be colored both with finished (coated) and unfinished pigments (unfinished pigments must be ground). Only in some cases can aqueous polyurethane suspensions be dyed satisfactorily with pigment preparations. Moreover, polyurethane coating powders are not colored to a sufficiently high intensity with pigment preparations.

One major disadvantage of one-component and two-component polyurethanes which contain color producing groups which are chemically incorporated in the polymer molecule is that they cannot be blended indiscriminately with any uncolored or differently colored polyurethane solutions because polyurethanes which differ from each other chemically are frequently incompatible with each other, depending on whether they have been synthesized from polyesters or polyethers, aliphatic or aromatic polyisocyanates or chain lengthening agents.

DESCRIPTION OF THE INVENTION

It has now been found that these difficulties can be obviated if poly(urethane)urea powders which contain chromophoric systems attached by urethane and/or urea groups are used as starting materials for coating or laminating sheets. These colored powders can be mixed with each other in any desired way and used in any combination with uncolored powders either dry or in the form of aqueous pastes or suspensions. It has surprisingly been found that neither the mechanical properties of the powders nor their preparation (preferably by a process analogous to that of German Offenlegungsschrift No. 2,226,526) is impaired if dyes containing groups which are capable of reacting with isocyanates (this reaction with isocyanates does not influence the mesomerism of the actual dye compound) are added in a quantity of up to about 10% by weight, based on the polyurethane solids content, when preparing the prepolymer. The term "dyes" is intended to include in this context so-called colorless dyes, e.g. stabilizers, age resistors, optical white toners, and the like.

The instant invention relates to thermoplastic polyurea powders, optionally containing urethane groups, characterized by
a. a smooth, substantially spherical or lenticular surface,
b. an average particle diameter of 5 to 1,000$\mu$, preferably 10 to 200$\mu$,
c. a urea group content, and, optionally a urethane group content, of 8 to 30% by weight,
d. an ionic group content of 0.01–0.15 milliequivalents per gram of solids, preferably 0.02–0.1 milliequivalent per gram and
e. 0.1 to 10% by weight, preferably 0.2 to 5% by weight, of an organic dye incorporated in the polymer molecule by way of at least one urethane and/or urea group.

The invention also relates to a process for preparing colored thermoplastic poly(urethane)urea powders with an average particle diameter of 5 to 1,000$\mu$ by reacting polyurethane and/or polyurea prepolymers which contain isocyanate groups and ionic groups with chain lengthening agents in the presence of water, the ionic group content in the prepolymers used being such that the products of the process have an ionic group content of 0.01 to 0.15, preferably 0.02 to 0.1, milliequivalents per gram of prepolymer solids and the chain lengthening agents used are primary and/or secondary diamines which contain aliphatically bound amino groups and/or dicarboxylic acid-bis-hydrazides and the NH/NCO ratio during the chain lengthening reaction is 0.1:1 to 0.95:1, preferably 0.25:1 to 0.85:1, characterized in that the prepolymers which contain NCO groups and ionic groups contain 0.1 to 10% by weight, based on the products of the process, of a dye which is attached to the prepolymer through at least one urethane and/or urea group.

The colored isocyanate-containing prepolymers having ionic groups which are used in the process according to the invention are prepared from:
  A. higher molecular weight organic polyhydroxyl and/or polyamino compounds with a molecular weight of 300 to 10,000, preferably 500 to 4,000.
  B. organic polyisocyanates,
  C. organic dyes which contain at least one, and, preferably 1–3 groups which are reactive with isocyanates,
  D. organic compounds which contain (1) at least one hydrogen atom which is reactive with isocyanate groups, or at least one isocyanate group and (2) at least one group which is capable of salt formation, and, optionally
  E. chain lengthening agents with molecular weights below 300.

Suitable higher molecular weight polyhydroxyl compounds are polyesters, polyethers, polythioethers, polyacetals, polycarbonates or polyesteramides which contain at least 2, and preferably 2 to 4 hydroxyl groups, of the kind which are generally known for the preparation of polyurethanes.

Suitable polyesters with hydroxyl groups include the reaction products of polyhydric, preferably dihydric alcohols with the optional addition of trihydric alcohols and polybasic, preferably dibasic carboxylic acids. The corresponding polycarboxylic acid anhydrides or corresponding polycarboxylic acid esters of lower alcohols or mixtures thereof may be used instead of free polycarboxylic acids for preparing the polyesters. The polycarboxylic acids may be aliphatic, cycloaliphatic, aromatic and/or heterocyclic and they may be substituted, e.g. with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and terephthalic acid-bis-glycol ester. Suitable polyhydric alcohols include ehtylene glycol, propylene-1,2- and -1,3-glycol, butylene-1,4- and -2,3-glycol, hexane-1,6-diol, octane-1,8-diol, neopentyl glycol, cyclohexanedimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, triethyleneglycol, tetraethyleneglycol, polyethylene glycols, dipropylene glycol, polypropylene glycol, dibutylene glycol and polybutylene glycols. The polyesters may contain a proportion of carboxyl end groups. Polyesters of lactones such as $\epsilon$-caprolactone or hydroxycarboxylic acids such as $\omega$-hydroxycaproic acid may also be used.

The hydroxyl polyethers suitable for the purpose of the invention, which contain at least 2, preferably 2 to 3 hydroxyl groups are also generally known and are obtained, e.g. by the polymerization of epoxides such as ethylene oxide, propylene oxide, tetrahydrofuran, styrene oxide or epichlorohydrin, each with itself, e.g. in the presence of $BF_3$, or by addition of these epoxides, optionally as mixtures or succesively, to starting components which contain reactive hydrogen atoms, such as alcohols or amines, e.g. water, ethylene glycol, propylene-1,3- or -1,2-glycol, trimethylolpropane, 4,4'-dihydroxydiphenylpropane, aniline, ammonia, ethanolamine or ethylene diamine. Polyethers which contain predominantly primary OH groups (up to 90% by weight based on all the OH groups in the polyether) are preferred. Polyethers which have been modified with vinyl polymers, e.g. the compounds which can be obtained by polymerizing styrene and acrylonitrile in the presence of polyethers (U.S. Pat. Nos. specs. 3,383,351; 3,304,273; 3,523,093 and 3,110,695 and German Patent No. 1,152,536) and polybutadienes which contain OH groups are also suitable.

The condensation products of thiodiglycol with itself and/or with other glycols, dicarboxylic acids, formaldehyde, aminocarboxylic acids or amino alcohols may be particularly mentioned as polythioethers. The products are polythiomixed ethers, polythioether esters or polythioether ester amides, depending on the cocomponents.

Suitable polyacetals include the compounds which can be prepared from glycols such as diethylene glycol, triethylene glycol, 4,4'-dioxethoxy-diphenyldimethylmethane, hexanediol and formaldehyde. Polyacetals suitable for the purpose of the invention can also be obtained by polymerizing cyclic acetals.

Suitable polycarbonates containing hydroxyl groups are known and include the compounds which can be obtained by reacting diols such as propane-1,3-diol, butane-1,4-diol and/or hexane-1,6-diol, diethylene glycol, triethylene glycol or tetraethylene glycol with diarylcarbonates, e.g. diphenylcarbonate or phosgene.

Among the polyester amides and polyamides which may be used are the predominantly linear condensates obtained from polybasic saturated and unsaturated carboxylic acids or their anhydrides and polybasic saturated and unsaturated amino alcohols, diamines, polyamines and their mixtures.

Apart from these compounds, higher molecular weight compounds which contain amino groups may also be used according to the invention, including those described in French Patent Nos. 1,361,810 and 1,300,981, in German Auslegeschrift No. 1,122,254 and U.S. Pat. No. 2,888,439.

It is generally preferred to use polyols which are crystalline at room temperature, and in particular, dihydroxypolyesters and dihydroxypolycarbonates.

Examples of the types of compounds which may be used according to the invention may be found in HIGH POLYMERS, Vol. XVI, "Polyurethanes, Chemistry and Technology", published by Saunders-Frisch, Interscience Publishers, New York, London, Volume I, 1962, pages 32–42 and pages 44–54 and Vol. II, 1964, pages 5–6 and 198–199 and in KUNSTSTOFF-HANDBUCH, Volume VII, Vieweg-Höchtlen, Carl-Hanser-Verlag, Munich, 1966, e.g. on pages 45 to 71.

The polyisocyanates used according to the invention may be essentially any organic polyisocyanate and include aliphatic, cycloaliphatic, araliphatic, aromatic or heterocyclic compounds as described e.g. by W. Siefgen in JUSTUS LIEBIGS ANNALEN der CHEMIE, 562, pages 75 to 136. Specific examples include ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixture of these isomers, 1-isocyanato-3,3,5-trimethyl-5-isocyanatometylcyclohexane (DAS 1,202,785), hexahydrotolylene-2,4- and -2,6-diisocyanate and any mixture of these isomers, hexahydrophenylene-1,3- and/or -1,4-diisocyanate, perhydrodiphenylmethane-2,4'- and/or -4,4'-diisocyanate, phenylene-1,3- and -1,4-diisocyanate, tolylene-2,4- and -2,6-diisocyanate and any mixture of these isomers, diphenylmethane-2,4'- and/or -4,4'-diisocyanate, naphthylene-1,5-diisocyanate, triphenylmethane-4,4',4''-triisocyanate, polyphenyl-polymethylene polyisocyanates which can be obtained by aniline-formaldehyde condensation followed by phosgenation and which have been described e.g. in British Patent Nos. 874,430 and 848,671, perchlorinated arylpolyisocyanates of the kind described e.g. in German Auslegeschrift No. 1,157,601, polyisocyanates which contain carbodiimide groups as described in German Patent No. 1,092,007, the diisocyanates according to U.S. Pat. No. 3,492,330, polyisocyanates which contain allophanate groups as described e.g. in British Patent No. 994,890, Belgian Patent No. 761,626 and published Dutch Patent Application No. 7,102,524, polyisocyanates which contain isocyanurate groups described e.g. in German Patent Nos. 1,022,789, 1,222,067 and 1,027,394 and in German Offenlegungsschriften Nos. 1,929,034 and 2,004,048, polyisocyanates with urethane groups as described e.g. in Belgian Patent No. 752,261 or in U.S. Pat. No. 3,394,164, polyisocyanates which contain acylated urea groups according to German Patent No. 1,230,778, polyisocyanates with biuret groups as described, e.g. in German Patent No. 1,101,394, in British Patent No. 889,050 and in French Patent No. 7,017,514, polyisocyanates prepared by telomerization reactions as described e.g. in Belgian Patent No. 723,640, polyisocyanates which contain ester groups as described, e.g. in British Patent Nos. 965,474 and 1,072,956, in U.S. Pat. No. 3,567,763 and in German Patent No. 1,231,668 and reaction products of the above-mentioned isocyanates with acetals according to German Patent No. 1,072,385. Any mixture of the above-mentioned polyisocyanates may also be used.

Aliphatic and cycloaliphatic polyisocyanates are generally preferred because of their high lightfastness. Hexane-1,6-diisocyanate and 1-isocyanato-3,3,5-trimethyl-5-isocyanatomethyl cyclohexane are particularly preferred.

Dyes which can be used according to the invention incude triphenylmethane, oxazine, triazine, nitro, methine and phthalocyanine dyes. The preferred materials are azo dyes and anthraquinone dyes which contain at least one reactive amino group, preferably a primary amino group, i.e. one which still contains at least one replaceable hydrogen atom. This amino group may be attached directly to the aromatic nucleus of the dye molecule or it may be connected to the dye molecule through a bridge, for example, through an alkylene group, an alkyleneamino group, an imino group, a CO group or an $SO_2$ group, as, for example, in the groups $NH—CH_2—CH_2NH_2$, $CONH_2$, $CONHNH_2$ or $SO_2NH_2$. In addition to or instead of reactive amino groups, the dyes may contain at least one aliphatically bound hydroxyl group or a carboxyl group or particularly an oxyalkyl group which preferably contains 1 to 3 and most preferably 2 carbon atoms. Groups of this kind (for example the oxymethyl group) may be attached directly to the aromatic nucleus, but they are preferably attached to the dye molecule through a bridging atom, for example through an oxygen, sulphur, nitrogen or urethane bridge, as, for example the following groups:

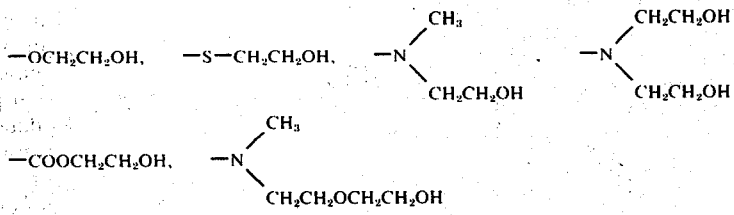

Compounds of this kind are particularly preferred because in these materials the suppression of mesomerism of the chromophoric system by the polyaddition reaction is very slight.

Among dyes of the azo series may be mentioned the diazo dyes, but particularly the monoazo dyes such as those of the benzene-azobenzene, benzene-azopyrazolone, benzene-azo-acetic acid-arylide and benzene-azonaphthalene series. In addition to the amino, hydroxyl or carboxyl groups defined above which are necessary according to the invention, the above-mentioned monoazo dyes may contain other substituents which are commonly found in azo dyes and which either do not react with isocyanates or only react much more slowly than the aforesaid groups. The following are examples of these additional substituents: halogen atoms, alkyl, trifluoromethyl, phenolic OH, alkoxy, acylamino, arylamino, dialkylamino, alkylsulphonyl, carboxylic acid ester, carboxylic acid and cyano groups.

Metal complexes are also suitable for the process according to the invention, for example chromium or cobalt complexes of azo dyes.

As examples of dyes of the anthraquinone series may be mentioned 1,4-diaminoanthraquinone, 1,4,5-triaminoanthraquinone, 1,4- or -1,5-diaminoethylaminoanthraquinone and 1,4-di-(3'-aminophenylamino)-anthraquinone.

Examples of phthalocyanine dyes include tri- or tetraaminomethyl-phthalocyanine and phthalocyanine-tetrasulphonamide, while fuchsine is an example of a dye of the triphenylmethane series.

Among the dyes incorporated in the molecule which are particularly preferred according to the invention are those of the following general structural formulae:

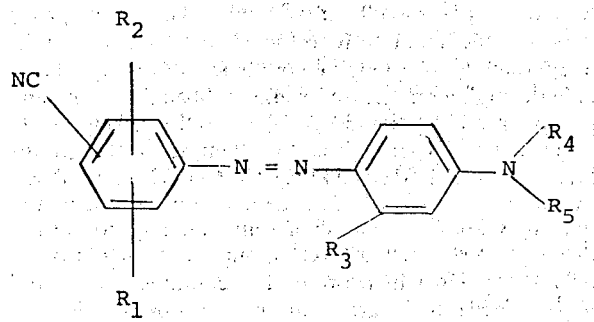

wherein:
R$_1$ denotes chlorine or cyano;
R$_2$ denotes hydrogen or chlorine;
R$_3$ denotes hydrogen, methyl or acetylamino; and
R$_4$ and R$_5$ denote 2-hydroxyethyl;
and

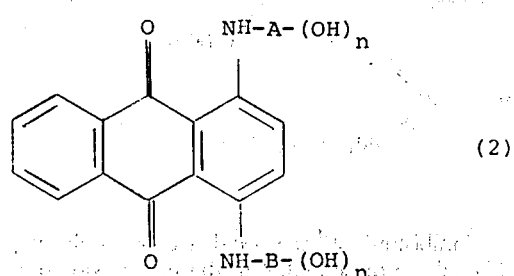

wherein:
A and B denote optionally branched alkyl chains with 2 to 4 C atoms; and
$n$ represents 1 or 2; and
A and B are preferably identical alkyl chains and $n$ is preferably 1.

Other dyes which are preferred according to the invention have the formula:

wherein:
$n$ denotes 1, 2, 3 or 4;
R$_1$ denotes cyano, chlorine or bromine;
R$_2$ denotes hydrogen, chlorine, bromine or methyl;
R$_3$ denotes hydrogen, a C$_1$–C$_4$ alkyl group optionally substituted by hydroxyl, cyano, chlorine or bromine or by C$_1$–C$_4$ alkoxy; a cyclohexyl, benzyl, phenethyl or phenyl group or tolyl or taken together with R$_4$ and the nitrogen atom it may represent pyrrolidinyl, piperidinyl or morpholinyl;
R$_4$ denotes hydrogen, a C$_1$–C$_4$ alkyl group optionally substituted by hydroxyl, cyano, chlorine, bromine or C$_1$–C$_4$ alkoxy, a benzyl, phenethyl or phenyl group or tolyl or taken together with R$_3$ it may also denote pyrrolidinyl, piperidinyl or morpholinyl;
R$_5$ denotes hydrogen, methyl or acetylamino;
R$_6$ denotes hydrogen or methoxy;
R$_7$ denotes hydrogen, an alkyl group with 1–4 carbon atoms, optionally substituted by hydroxyl, C$_1$–C$_4$ alkoxy, carbo-C$_1$–C$_4$ alkoxy or oxycarbonyl-C$_1$–C$_4$ alkyl, or it may denote benzyl or phenethyl; and
R$_8$ denotes a C$_1$–C$_{14}$ alkyl group optionally substituted by hydroxyl or cyano, or it may denote benzyl or phenethyl,
and the OH groups are attached to the molecule through alkyl groups R$_3$, R$_4$, R$_7$ or R$_8$.

Dyes of the following general formulae are also particularly suitable for the purpose of the invention:

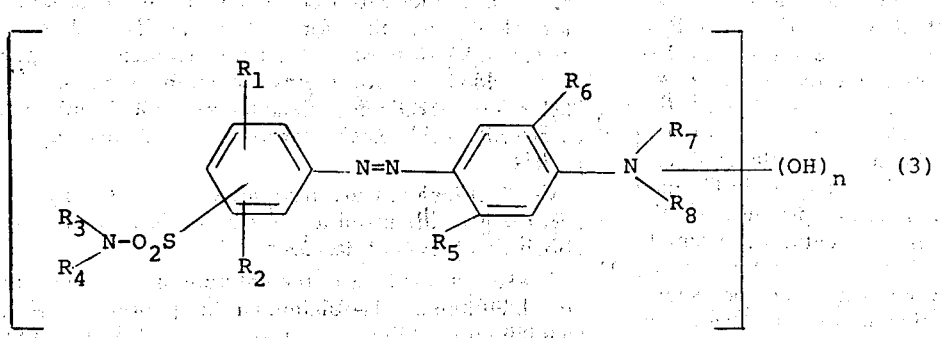

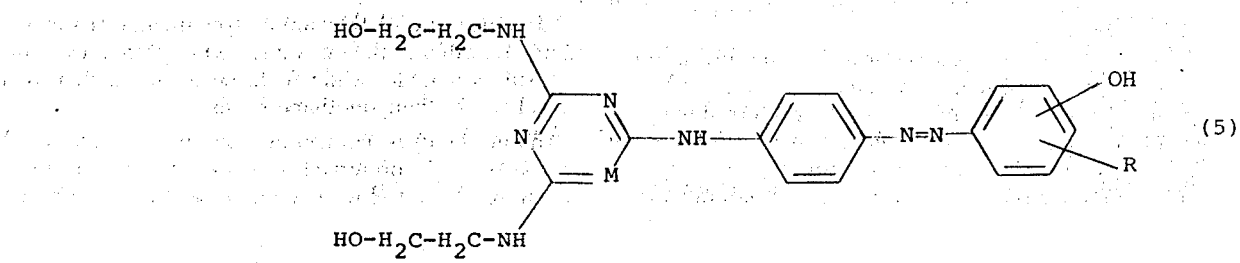

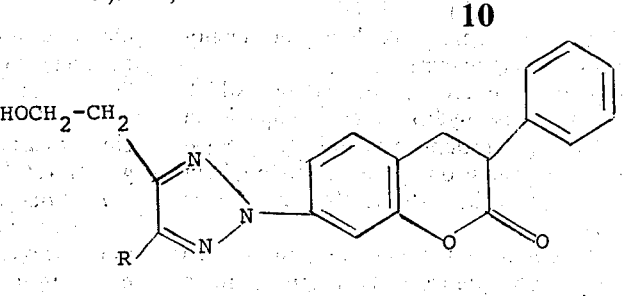

(R = phenyl or -CH₂-CH₂-OH)

and

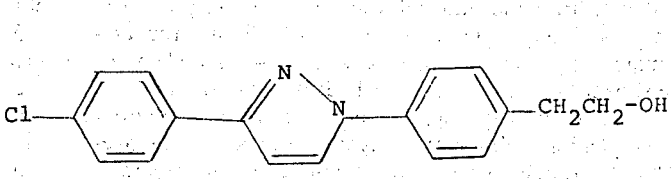

wherein:
  M denotes C—Cl or N; and
  R denotes H or $C_1$-$C_4$ alkyl, and the phenolic OH group is in the ortho- or para-position in the azo group; and

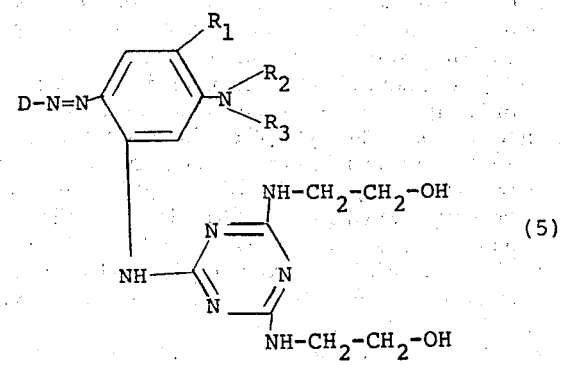

wherein:

D denotes 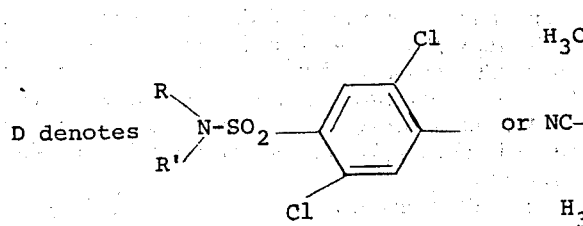 or 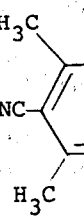

R and R' denote hydrogen or methyl;
$R_1$ denotes hydrogen, methoxy or ethoxy; and
$R_2$ and $R_3$ denote hydrogen, $C_1$-$C_4$ alkyl, hydroxyethyl, cyanoethyl or halogenated $C_1$-$C_4$ alkyl or $C_1$-$C_4$-alkyl carbonyloxyethyl.

The following formulae represent examples of optical brightening agents which can be chemically incorporated into poly(urethane)urea powders in accordance with the invention:

The dyes used according to the invention should contain 1 to 3 and preferably 2 groups which are reactive with isocyanates. The dye molecules act as chain breaking agents, chain lengtheners or cross-linking agents in the polyaddition reaction, depending on their functionality. If dyes which are monofunctional with respect to isocyanates are used, at least one of the other components used for the preparation of the prepolymer should have a functionality greater than 2. On the other hand dyes with a functionality of 3 or more should be compensated by monofunctional components so that the total functionality of the prepolymer is about 1.5 to 3.0, preferably about 2, so that substantially linear polyaddition products are formed. However, it should be borne in mind that hydroxyl or amino groups which are directly attached to an aromatic nucleus are in many cases relatively or almost completely inert towards isocyanates, due, for example, to the formation of intramolecular hydrogen bridge bonds, so that the only OH or NH₂ groups which need then be taken into account are those which, as described above, are attached to the nucleus through bridging atoms.

Low molecular weight chain lengthening agents having reactive hydrogen atoms which may, if desired, be used in the preparation of the prepolymer include the usual glycols such as ethylene glycol, di-, tri- and tetraethylene glycol, butanediol, propane-1,2-diol, propane-1,3-diol, neopentyl glycol and dioxethoxyhydroquinone, diamines such as ethylenediamine or hexamethylenediamine, hydrazine, ammonia, benzidine or diaminodiphenylmethane, amino alcohols and monofunctional alcohols and/or amines.

The following may be used as compounds which contain (1) at least one hydrogen atom capable of reacting with isocyanate groups or at least one isocyanate group and (2) at least one group capable of salt formation. If desired, these compounds may also be used as mixtures:

1. Compounds containing basic amino groups which can be neutralized with aqueous acids or tertiary amino groups which can be quaternized:

a. alcohols, such as alkoxylated aliphatic, cycloaliphatic, aromatic and heterocyclic secondary amines, e.g. N,N-dimethylethanolamine, N,N-diethylethanolamine, N,N-dibutylethanolamine, 1-dimethylaminopropanol-(2), N,N-methyl-β-hydroxyethylaniline, N,N-methyl-β-hydroxypropylaniline, N,N-methyl-β-hydroxyethylaniline, N,N-butyl-β-hydroxyethylaniline, N-oxethylpiperidine, N-oxethylmorpholine, α-hydroxyethylpyridine and γ-hydroxyethylquinoline.

b. diols and triols, such as alkoxylated aliphatic, cycloaliphatic, aromatic and heterocyclic primary amines, e.g. N-methyldiethanolamine, N-butyl-diethanolamine, N-oleyldiethanolamine, N-cyclohexyldiethanolamine, N-methyldiisopropanolamine, N-cyclohexyl-diisopropanolamine, N,N-dioxethylaniline, N,N-dioxethyl-m-toluidine, N,N-dioxethyl-p-toluidine, N,N-dioxypropyl-naphthylamine, N,N-tetraoxethyl-α-amino-pyridine, dioxethylpiperazine, polyethoxylated butyldiethanolamine, polypropoxylated methyldiethanolamine (molecular weight 1000), polypropoxylated methyldiethanolamine (molecular weight 2000), polyesters containing tert.-amino groups, tri-[2-hydroxypropyl-(1)]-amine, N,N-di-n-(2,3-dihydroxypropyl)-aniline, N,N'-dimethyl-N,N'-bisoxethylhydrazine and N,N'-dimethyl-N,N'-bis-oxypropylethylenediamine, c. amino alcohols, e.g. hydrogenated addition products of alkylene oxide and acrylonitrile to primary amines, such as N-methyl-N-(3-amino-propyl)-ethanolamine-N-cyclohexyl-N-(3-aminopropyl)-propanol-(2)-amine, N,N-bis-(3-aminopropyl)-ethanolamine and N-3-aminopropyldiethanolamine.

d. amines, such as N,N-dimethylhydrazine, N,N-dimethylethylenediamine, 1-di-ethylamino-4-aminopentane, α-aminopyridine, 3-amino-N-ethylcarbazole, N,N-dimethylpropylenediamine, N-aminopropylpiperidine, N-aminopropyl-morpholine, N-aminopropylethyleneimine and 1,3-bis-piperidine-2-aminopropane.

e. diamines, triamines, and amides, such as compounds which can be obtained by hydrogenating the addition products of acrylonitrile to primary or disecondary amines, including bis-(3-aminopropyl)-methylamine, bis-(3-aminopropyl)-cyclohexylamine, bis-(3-aminopropyl)-aniline, bis-(3-aminopropyl)-toluidine, diaminocarbazole, bis-(aminopropoxethyl)-butylamine, tris-(aminopropyl)-amine or N,N'-bis-carbonamidopropyl-hexamethylenediamine, as well as compounds obtainable by the addition of acrylamide to diamines or diols.

2. Compounds containing halogen atoms which are capable of quaternization reactions or the corresponding esters of strong acids such as: 2-Chloroethanol, 2-bromoethanol, 4-chlorobutanol, 3-bromopropanol, β-chloroethylamine, 6-chlorohexylamine, ethanolamine-sulphuric acid ester, N,N-bis-hydroxyethyl-N'-m-chloromethylphenylurea, N-hydroxyethyl-N'-chlorohexylurea, glycerolamino-chloroethyl-urethane, chloroacetyl ethylene diamine, bromoacetyldipropylene triamine, trichloroacetyl-triethylenetetramine, glycerol-α-bromohydrin, polypropoxylated glycerol-α-chlorohydrin, polyesters with aliphatically bound halogen or 1,3-dichloropropanol-2.

The following are examples of suitable isocyanates which contain halogen atoms: Chlorohexylisocyanate, m-chlorophenyl-isocyanate, p-chlorophenylisocyanate, bis-chloromethyldiphenylmethane-diisocyanate, 2,4-diisocyanato-benzyl chloride, 2,6-diisocyanato-benzyl chloride, N-(4-methyl-3-isocyanatophenyl)-β-bromoethylurethane.

3. Compounds containing carboxylic acid or hydroxyl groups which are capable of salt formation:

a. Hydroxycarboxylic and mercaptocarboxylic acids: Glycollic acid, thioglycollic acid, lactic acid, trichlorolactic acid, maleic acid, dihydroxymaleic acid, dihydroxyfumaric acid, tartaric acid, dihydroxytartaric acid, mucic acid, saccharic acid, citric acid, glyceroboric acid, pentaerythritoboric acid, mannitoboric acid, salicyclic acid, 2,6-dihydroxybenzoic acid, protocatechuic acid, α-resorcyclic acid, β-resorcylic acid, hydroquinone-2,5-dicarboxylic acid, 4-hydroxyisophthalic acid, 4,6-dihydroxyisophthalic acid, hydroxyterephthalic acid, 5,6,7,8-tetrahydro-naphthol-(2)-carboxylic acid-(3), 1-hydroxynaphthoic acid-(2), 2,8-dihydroxynaphthoic acid-(3), β-hydroxypropionic acid, m-hydroxybenzoic acid, pyrazolone carboxylic acid, uric acid, barbituric acid, resoles and other phenolformaldehyde condensation products.

b. Polycarboxylic acids: Sulphonediacetic acid, nitrilotriacetic acid, ethylene-diaminotetracetic acid, diglycollic acid, thiodiglycollic acid, methylene-bis-thioglycollic acid, malonic acid, oxalic acid, succinic acid, glutaric acid, adipic acid, maleic acid, fumaric acid, gallic acid, phthalic acid, tetrachloro-phthalic acid, isophthalic acid, terephthalic acid, naphthalene-1,4,5,8-tetracarboxylic acid, o-tolylimido-diacetic acid, β-naphthylimido-diacetic acid, pyridine dicarboxylic acid, dithiodipropionic acid.

c. Amino carboxylic acids: Oxaluric acid, anilinoacetic acid, 2-hydroxy-carbazole-carboxylic acid-(3), glycine, sarcosine, methionine, α-alanine, 6-aminocaproic acid, 6-benzoylamino-2-chlorocaproic acid, 4-aminobutyric acid, aspartic acid, glutamic acid, histidine, anthranilic acid, 2-ethylamino-benzoic acid, N-(2-carboxyphenyl)-aminoacetic acid, 2-(3'-aminobenzenesulphonylamino)-benzoic acid, 3-aminobenzoic acid, 4-aminobenzoic acid, N-phenylaminoacetic acid, 3,4-diaminobenzoic acid, 5-aminobenzene-dicarboxylic acid, and 5-(4'-aminobenzoyl-amino)-2-amino-benzoic acid.

d. Hydroxy and carboxy sulphonic acids: 2-Hydroxyethanesulphonic acid, phenolsulphonic acid-(2), phenolsulphonic acid-(3), phenolsulphonic acid-(4), phenol-disulphonic acid-(2,4), sulphoacetic acid, m-sulphobenzoic acid, p-sulphobenzoic acid, benzoic acid-(1)-disulphonic acid-(3,5), 2-chlorobenzoic acid-(1)-sulphonic acid-(4), 2-hydroxybenzoic acid-(1)-sulphonic acid-(5), naphthol-(1)-sulphonic acid, naphthol-(1)-disulphonic acid, 8-chloro-naphthol-(1)-disulphonic acid, naphthol-(1)-trisulphonic acid, naphthol-(2)-sulphonic acid-(1), naphthol-(2)-trisulphonic acid, 1,7-dihydroxy-naphthalene-sulphonic acid-(3), 1,8-dihydroxynaphthalene-disulphonic acid-(2,4), chromo-tropic acid, 2-hydroxynaphthoic acid-(3)-sulphonic acid-(6) and 2-hydroxycarbazole-sulphonic acid-(7).

e. Aminosulphonic acids: Amidosulphonic acid, hydroxylamine, monosulphonic acid, hydrazine disulphonic acid, sulphanilic acid, N-phenylaminomethanesulphonic acid, 4,6-dichloroaniline-sulphonic acid-(2), phenylenediamine-(1,3)-disulphonic acid-(4,6), N-acetyl-naphthylamine-(1)-sulphonic acid-(3), naphthylamine-(1)-sulphonic acid, naphthylamine-(2)-sulphonic acid, naphthylamine disulphonic acid, naphthylamine trisulphonic acid, 4,4'-di-(p-aminobenzoylamino)-diphenylurea-disulphonic acid-(3,3'), phenylhydrazine-disulphonic acid-(2,5), 2,3-dimethyl-4-aminobenzene-disulphonic acid-(4',5'), 4'-aminostilbene-disulphonic acid-(2,2)-4-azo-4-anisole, carbazole-disulphonic acid-(2,7), taurine, methyltaurine, butyltaurine, 3-aminobenzoic acid-(1)-sulphonic acid-(5), 3-aminotoluene-N-methane-sulphonic acid, 6-nitro-1,3-dimethylbenzene-4-sulphamic acid, 4,6-diaminobenzene-disulphonic acid-(1,3), 2,4-diaminotoluene-sulphonic acid-(5), 4,4'-diaminodiphenyldisulphonic acid-(2,2'), 2-aminophenolsulphonic acid-(4), 4,4'-diamino-diphenylether-sulphonic acid-(2), 2-aminoanisole-N-methanesulphonic acid and 2-aminodiphenyl-amine-sulphonic acid.

The salt-forming agents used for Group 1 may be inorganic or organic acids or compounds which contain reactive halogen atoms or corresponding esters of strong acids. The following are examples of such compounds: Hydrochloric acid, nitric acid, hypophosphorous acid, amidosulphonic acid, hydroxylamine monosulphonic acid, formic acid, acetic acid, glycollic acid, lactic acid, chloroacetic acid, ethylbromoacetate, sorbitoboric acid, methyl chloride, butyl bromide, dimethylsulphate, diethylsulphate, benzyl chloride, methyl-p-toluenesulphonate, methyl bromide, ethylene chlorohydrin, ethylenebromohydrin, glycero-α-bromohydrin, chloroacetic ester, chloroacetamide, bromoacetamide, dibromoethane, chlorobromotoluene, dibromobutane, ethylene oxide, propylene oxide and 2,3-epoxypropanol.

The compounds of Group 2 may be quaternized or ternized with tertiary amine, sulphides or phosphines. Quaternary ammonium and phosphonium salts and tertiary sulphonium salts are than obtained. Examples include, among others, trimethylamine, triethylamine, tributylamine, pyridine, triethanolamine, and the compounds mentioned under Groups 1a and 1b as well as dimethylsulphide, diethylsulphide, thiodiglycol, thiodiglycollic acid, trialkylphosphines, alkylarylphosphines and triarylphosphines.

The salt forming agents used for compounds of Group 3 may be inorganic or organic bases such as sodium hydroxide, potassium hydroxide, potassium carbonate, sodium bicarbonate, ammonia, and primary, secondary and tertiary amines. Finally, it should be mentioned that organic phosphorous compounds are also capable of salt formation, both basic phosphines which are capable of being incorporated into the molecule, such as diethyl-β-hydroxyethylphosphine, methyl-bis-β-hydroxyethylphosphine or tris-β-hydroxymethyl-phosphine and derivatives such as phosphinic acids, phosphonous acids, phosphonic acids and esters of phosphorous and phosphoric acid as well as their thioanalogues, e.g. bis-(α-hydroxyisopropyl)-phosphinic acid, hydroxyalkane-phosphonic acid or bis-glycol phosphate.

The total quantity of the salt forming component used is such that the finished polyurethane contains 0.01 to 0.15 and preferably 0.02 to 0.1 milliequivalents of ionic groups per gram of total solids. This total quantity of course also includes any ionic groups introduced into the polymer by the dye.

When preparing the prepolymer, the starting components (A) to (E) could in principle be reacted together in any sequence but it is preferable to first react the dye with the polyisocyanate and then to add the reaction product to the higher molecular weight polyhydroxyl or polyamino compound. Alternatively, the dye may be dissolved in component (A) and then the resultant solution reacted with the isocyanate. Another alternative is to first prepare a prepolymer from components (A) and (B) and to then add the dye, optionally dissolved in a solvent. Whichever method is used, the substance obtained may then be reacted with components D and optionally E.

If the salt forming components have a functionality of at least two, they may, of course, partly or completely replace the polyhydroxyl compounds, polyisocyanates and optionally the chain lengthening agents for synthesizing the prepolymer depending upon the specific salt forming component used.

If the salt forming component (D) is only monofunctional or more than bifunctional, then this functionality should be compensated by the presence of some other trifunctional or monofunctional component when synthesizing the prepolymer, as has already been explained in connection with the dyes. The prepolymers, which are preferably substantially linear, have a molecular weight of 500 to 25,000, preferably 800 to 15,000 and most preferably 2000 to 7000.

The colored NCO prepolymer is then reacted in known manner preferably with (cyclo)aliphatic primary and/or secondary diamines and/or dicarboxylic acid-bis-hydrazides.

An organic solvent is preferably added during or after formation of the colored prepolymer which contains both isocyanate groups and ionic groups. The solution obtained is then combined with an aqueous solution of chain lengthening agent, and the organic solvent is finally removed, preferably by distillation. If this method is employed, the powders which are to be used according to the invention are obtained in the form of a stable aqueous suspension which forms a sediment.

One special advantage of this embodiment is that no high speed stirrer is required since the NCO prepolymer and chain lengthening agent can be combined by simply stirring them together at a relatively low speed.

The properties of the poly(urethane)urea powders obtained in this way can be varied as desired within wide limits by suitable measures. This particularly applies to the hardness and the size of the particles.

The first possibility of influencing the properties of the product lies in the structure of the ionic prepolymer which contains isocyanate groups.

The size of the particles is influenced to a critical degree by the ionic group content of the prepolymer while the hardness is determined mainly by the chemical nature of the polyisocyanates or compounds with reactive hydrogen atoms used for the preparation of the NCO prepolymers. If these compounds are restricted to those of low molecular weights of up to about 500, then comparatively hard polyurethanes are obtained whereas if exclusively higher molecular weight compounds having molecular weights of up to about 10,000 are used then softer products are obtained. Mixtures in any proportions between these extremes are possible. A strictly linear chain structure is not essential since relatively large isocyanate excesses are employed for prepolymer formation, the molar ratio of NCO groups to reactive hydrogen atoms being suitably between 4 and 1:1 and preferably between 2 and 1.4. Consequently, the molecular weights of the prepolymers obtained are not very high. However, as explained above, the powders are preferably prepared from NCO prepolymers which have a linear structure and contain an average of two aliphatically bound isocyanate end groups.

The polyurethane powders according to the invention may in principle be prepared by the processes disclosed in Belgian Pat. Nos. 653,223 and 730,543 for producing emulsifier-free polyurethane dispersions.

For this purpose, a solution of the prepolymer is preferably reacted with an aqueous solution or dispersion of chain lengthening agent. In exceptional cases, the chain lengthening agent may be added during dispersion in the form of a solution in an organic solvent.

Suitable chain lengthening agents are preferably primary and/or secondary diamines which contain aliphatically bound amino groups and dicarboxylic acid-bis-hydrazides. (When using the last mentioned chain lengthening agents it should be noted that the first groups to react with the NCO prepolymers are the amino groups in the β-position to the carbonyl groups, so that dicarboxylic acid-bis-hydrazides may initially be regarded as difunctional chain lengthening agents.) Suitable diamines are particularly those having a molecular weight below 250, including ethylenediamine, propylene-1,2-diamine, N-methylpropylenediamine, butylenediamine, hexamethylenediamine, piperazine, 2-methylpiperazine, dimethylpiperazines, N,N'-dimethylethylenediamine, N,N'-diethyldiethylenediamine, N,N'-diisopropyl-ethylenediamine, N,N'-dimethyl-1,2-propylene diamine, N,N'-diisopropyl-1,2-propylenediamine, N,N'-bis-hydroxyethyl-ethylenediamine, N-hydroxyethyl-ethylene-diamine, N-hydroxypropyl-ethylenediamine, N,N'-bis-(hydroxypropyl)-ethylenediamine, N,N'-dimethyl-hexamethylenediamine, propylene-1,3-diamine, γ,γ'-bis-aminopropylsulphide, γ,γ'-bis-aminopropyl-methylamine, N,N-bis-(γ-aminopropyl)-aniline, N,N-bis-(γ-aminopropyl)-m-toluidine, and the like. Ester diamines, ester diamines and diamines which are formed by hydrogenation or cyanoethylated diols or bifunctional dihydroxypolyesters or dihydroxypolyethers are also suitable chain lengthening agents.

The diamines may be used in the form of their salts, for example, the carbonates or acetates. Salt formation may be carried out only partially, e.g. to improve the solubility. Salt formation on the primary amino group reduces the reactivity.

The dicarboxylic acid-bis-hydrazide usable include bis-hydrazides of dicarboxylic acids with a molecular weight below 250, such as carbonic acid-bis-hydrazide, oxalic acid-bis-hydrazide, succinic acid-bis-hydrazide, adipic aid-bis-hydrazide, phthalic acid-bis-hydrazide, terephthalic acid-bis-hydrazide, tetrahydrophthalic acid-bis-hydrazide, and the like. Difunctional polyesters having carboxylic acid-hydrazide end groups may also be used.

Solvents used for preparing the products according to the invention may be water miscible compounds boiling below 100°C, such as acetone, methyl ethyl ketone, tetrahydrofuran or ethyl acetate. Solvents which are not miscible with water may also be used if thorough mixing of the reactants is ensured by vigorous stirring. Benzene and toluene are examples of such solvents. Solvents with boiling points above 100°C, such as toluene mentioned above or chlorobenzene, dimethylformamide or dimethylsulphoxide may also be used but their removal from the products of the process generally involves complications.

The preferred polyurethane powders according to the invention are prepared as follows: The ionic NCO prepolymers are prepared from dihydroxy compounds having molecular weights of 500 to 5000, diisocyanates, dyes and optionally chain lengthening agents, using such an excess of diisocyanate that the adduct contains 1 to 4% by weight of free NCO groups. The NCO prepolymer also contains 1 to 15 milliequivalents of ionic groups per 100 grams of prepolymer solids.

The 30 to 90% by weight solutions of ionic NCO prepolymer in acetone (viscosity at 50°C approximately 30–8000 cP) are mixed with aqueous solutions of aliphatic diamines which contain primary and/or secondary amino groups. The acetone is then distilled off and the polyurethane urea powder is obtained in the form of an aqueous, sedimenting dispersion. The product of the process may be obtained in a pure form simply by filtration and may be redispersed in water at a later date, when required.

In the chain lengthening reaction, the aqueous solution may be added to the acetonic solution with stirring or the acetonic solution added to the aqueous solution. Mixing of the components is preferably carried out continuously in a suitable apparatus by feeding the two solutions into a mixing vessel, for example, by means of pumps. In the simplest case the mixing vessel is equipped with a stirrer and an overflow from which the aqueous-acetonic dispersion flows into a distillation apparatus. The dispersion temperature is between 20° and 60°C, preferably between 35° and 55°C. The quantity of water in which the diamine must be dissolved for dispersion amounts to 0.8 to 3 times and preferably 1 to 2 times that of the ionic NCO prepolymer.

For mixing the components continuously at a high output rate, it is preferred to use high-speed stirrer assemblies or mixers in which high shearing forces can be produced. Suitable apparatus such as screw extruders, in particular multiscrew extruders, internal mixers, high pressure or low pressure mixing chambers with counterflow mixing or ultrasound dispersing apparatus are known. If such apparatus is employed, it is preferable to use 70 to 90% solutions and if the prepolymer is sufficiently fluid the process may even be carried out without solvent.

The properties of the polyurea powders obtained initially as suspensions can be influenced in a controlled manner not only by the chemical composition of the polyisocyanate prepolymer but also by the conditions under which dispersion is carried out. The most important factors are the nature and quantity of chain lengthening agent, the quantity of water, the nature and quantity of organic solvent, the pH and the reaction temperatures, which may vary from about 0°C to the boiling point of the organic solvent. Pressure may also be employed.

Another important factor is the method employed for mixing the aqueous and organic phase, i.e. whether this is carried out practically in a single step, for example, in a continuously operating mixing apparatus, or whether the organic phase is introduced into the aqueous phase or the aqueous phase into the organic phase. It must be again emphasized that perfectly suitable products can also be obtained by simple means, for example, by running the aqueous phase into the organic phase with stirring, using an ordinary stirrer. The organic solvent is removed by distillation during or after the mixing process. The finished powder is obtained from the resulting aqueous polyurethane dispersion by filtration.

The polyurethane powders may be applied by the usual spread coating processes, i.e. with the aid of fixed coating systems such as air knives, rubber blanket coaters and doctor rolls or roll coaters or reverse roll coaters. It is surprisingly found that the polyurethane powders according to the invention can also be spead coated in the dry state by methods which can normally be applied industrially only to pasty mixtures. This invention therefore also relates to the use of colored poly(urethane)urea powders for producing sheets or for coating and laminating flexible substrates, in particular textile substrates, by the direct or reverse process. The powders according to the invention are preferably applied dry to a separating support or flexible substrate in conventional coating installations using conventional spread coating and sieving processes, and then sintered by heat and/or melted and then calendered if necessary. This preferred use of the powders according to the invention constitutes an important advance in the field of coating techniques.

The methods already known in the art for coating and laminating sheets include doctor kiss coating, slop padding, spraying and calendering processes. For practical reasons it is necessary in most cases to use coating or laminating substances which can be applied in the liquid state. Exceptions to this are the calendering processes customarily employed in the rubber industry, the method of laminating by flaming polyurethane foams and the application of polymer powders for heat sealing sheets of all kinds. Another known method is the wiper or doctor knife application of substances such as polyethylene powders for backing carpets or floor coverings used in the construction of motor vehicles. Leaving aside these exceptions, coating and laminating processes have previously depended on the availability of products within a suitable range of viscosities which could be spread coated or sprayed by technical processes.

The necessary consistency can be imparted to thermoplastic polymers for example by heating them above their melting point, a procedure which is employed in the so-called roller melt process. However, one disadvantage of this method is that the polymers are exposed for a considerable time to a combination of elevated temperatures and severe mechanical stress. Not all polymers are capable of withstanding such stresses. Moreover, the precision of the rollers, that is to say their so-called convex property, must be maintained to a degree which is difficult to fulfill in practice regardless of temperature, especially if very thin layers are applied (20 to 40 g/m$^2$).

The method of dissolving polymers in organic solvents and then applying the solutions by painting or spraying is widely used in practice. The particular advantages of these systems as well as their disadvantages are well known. The solids concentrations of the spreadable or sprayable solutions are relatively low, especially in high quality products based on polyurethanes, with the result that considerable quantities of solvents are involved in the coating or laminating process. Moreover, for ecological and economical reasons it is necessary to recover the evaporated solvent or solvent mixtures and if possible return them to the process after careful rectification. The operations required for dissolving and filtering the pastes are also very time consuming and involve considerable expenditure on apparatus.

Increasing use is being made of the possibility of using aqueous emulsions or dispersions of polymers for coating and laminating processes. The particularly interesting feature of these systems is their physiological and ecological harmlessness. However, a disadvantage is that very few emulsions or dispersions of synthetic polymers are stable under freezing conditions. In contrast to frozen solutions, e.g. of polyurethanes in organic solvents, frozen aqueous emulsions or dispersions are in most cases no longer usable when thawed.

One disadvantage of the application of aqueous pastes is that evaporation of the water requires a considerable amount of energy which is even greater than that required when applying organic solutions.

There is therefore a great interest in the coating industry for systems which can be applied by dry methods without any solvents or dispersing agents.

Although the application of polyurethane powders by a modified electrostatic powder spray process (EPS process) has already been described in Belgian Patent No. 770,420, the process can be used only for applying powders which have quite specific electrical properties and a current flow resistance of not less than $10^{14}$ Ohm . cm, apart from the fact that very special and complicated machine techniques are required.

A knife coating application is generally discussed in Belgian Patent No. 664,168, but the powders according to Belgian Patent No. 664,168 are obtained in such a form that they can only be applied in heavy layers when spread by knife coating and are therefore not universally applicable.

There is therefore a gap in the technical provisions available for coating and laminating sheets, and this gap has been closed by the powders of the instant invention. In contrast to Belgian Patent No. 770,420, the powder spray or a EPS technique can be used for application but is not necessary. The powders according to the instant invention differ from the products according to Belgian Patent No. 664,168 by the fact that they can be used to produce both homogeneous and non-homogeneous, regular or irregular coats with weights per unit area ranging upwards from 10 g/m$^2$ to any thickness desired.

As comparative tests with other powders have shown, these surprising properties of the products according to the instant invention are due to the fact that the powders according to the invention fulfull numerous criteria which are mainly connected with the surface nature and fusion properties of the solid particles.

To be useful in such applications, polymers must generally possess various properties. The diameter of the particles of such polymers should be between 5 and 200 $\mu$, preferably between 8 and 150 $\mu$. The particles should have a smooth surface and more or less spherical shape to ensure easy spreading and pouring qualities of the dry powder.

The fusion properties of the polymers are particularly important. It is found that the best method of characterizing products which can be applied according to the invention consists of plotting an INTRINSIC MELT INDEX (IMI) CURVE.

To determine the intrinsic melt index which is independent of time, the resin melt heated to a predetermined temperature is forced at a given pressure through a channel (nozzle) which has a given diameter to length ratio, and the quantity extruded is determined by weighing and is used as a measure of the melt index analogously to ASTM D 1238-65 T. If the melt index is determined in this way after varying lengths of preheating times and the results are extrapolated to $t = 0$, then the intrinsic melt index is obtained (it is always assumed that the relationship between time and melt index is linear). This intrinsic melt index of a given material is a constant which is independent of the preheating time. The intrinsic melt index thus indicates the quantity of material which would be extruded under predetermined test conditions after a preheating time of 0 minutes, if it were possible to heat the material to the test temperature within 0 minutes.

If the intrinsic melt index is measured at varying temperatures under otherwise identical conditions, and the results obtained are entered in a coordinate system and the points are connected, the graphs obtained are either straight line having characteristic gradients or curves.

It was found that for coating and laminating purposes it is most suitable to use those polyurethane powders which have melting points or melting ranges between 110° and 250°C, preferably between 110° and 190°C. In addition, the shape of the IMI curves should resemble the ascending branch of a parabola so that the IMI value varies from 2 g/10 min to 50 g/10 min within a temperature interval of 5° to 50°C, preferably 10° to 40°C.

In addition, the polymers must have an ionic group content of 0.01 to 0.15 milliequivalents per gram and a current flow resistance of $10^{10} - 10^{14}$ Ohm.cm in order to prevent unwanted electrostatic charging which would cause the powder to stick to the machine used during the coating process.

All these conditions can be fulfilled with the powders according to the instant invention.

The powders of the instant invention are generally so fine and easily pourable that they can pass through the finest nozzle of the glass nozzle series used to determine the pourability according to the DEGUSSA system without any other additives or grinding treatments.

If desired, a further improvement can be achieved by adding small quantities of magnesium stearate or other conventional lubricants. The quantities added may be between 0.1% and 5%, based on the total solids content.

The pourability of the powders is surprisingly good even when they have a residual moisture content of 0.1 to 5% of water bound by adsorption. This residual moisture may even be desirable because such small quantities of water plasticize the resin and slightly lower the melting point of the products. The powders according to the invention may be used both for direct coating and for reverse coating, the latter being preferred. For reverse coating, it is advantageous to use a separating support of silicone treated rubber or better still a steel belt although conventional separating paper may, of course, also be used.

The thickness of the coatings is between 10 g/m² and several 100 g/m².

If, immediately after they have been applied by doctor coating or sieving, the powders are suddenly heated to temperatures above their melting point by exposing them to heat, for example, an IR field, they melt to form homogeneous sheets. If, on the other hand, the dry powders are slowly heated only to their melting point after they have been applied, then a layer with a macroporous structure is obtained, hereinafter referred to as a frit.

As already mentioned above, the colored powders of the instant invention can be easily mixed with any colorless polyurethane or other resin powders, provided only that the different powders have approximately the same melting range. If colorless powders are to be colored, it is suitable to use about 2 to 100 parts, preferably 5 to 20 parts of the colored powder per 100 parts of colorless powder, the quantity varying according to the color intensity desired. On the other hand, a thin layer (about 40 g/m²) of pure colored powder may be applied to a colorless sheet or coating, preferably one of a polyurethane or polyurethane urea, and fixed by heating. Very interesting and aesthetically pleasing color effects can be obtained by unevenly mixing various colored powders with each other or with colorless powders. These effects can be obtained, e.g. by vigorously mixing the following: (1) A colorless powder with 5% of an intense red powder, (2) a colorless powder with 2% of carbon black and (3) a colorless powder with 2% of aluminum bronze. Mixtures (1), (2) and (3) are applied alternately to a separating support by means of traverse motion nozzles at a chosen rhythm and then calibrated with a fixed doctor knife to form a coating of uniform thickness which is then sintered to a film. A sheet with a colored pattern is thereby obtained. On the other hand, the powders may be spread coated but not calibrated to a layer of uniform thickness. In that case, the sheet obtained not only has a colored pattern but also varying thicknesses.

These effects are surprising and, of course, unobtainable with colored solutions.

Apart from this preferred application of the powders by dry doctor coating and sieving, the colored powders according to the invention may, of course, also be applied as pastes or aqueous suspensions. In this case, they may also be mixed with each other and with any colorless products.

Finally, the color powders according to the invention may also be dissolved in a suitable organic solvent and used in this form, e.g. for coloring one-component polyurethanes. This, however, presupposes chemical compatibility of the products, as discussed above.

The following Examples serve to explain the invention but not to restrict its scope.

Summary of the dyes used in the Examples
Dye I
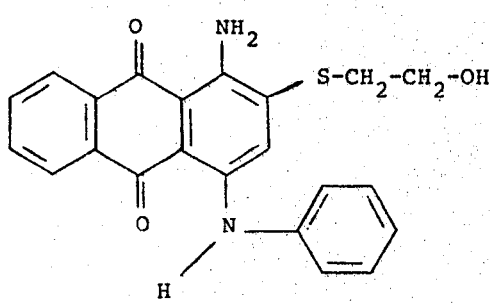
Dye II
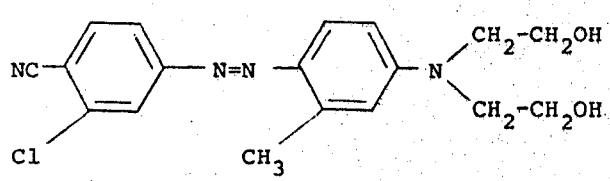
Dye III
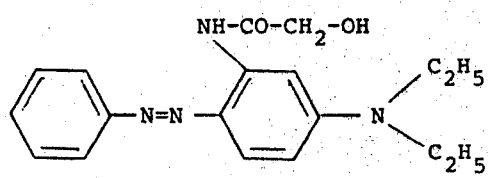
Dye IV
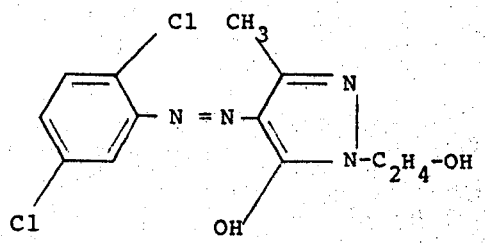
Dye V
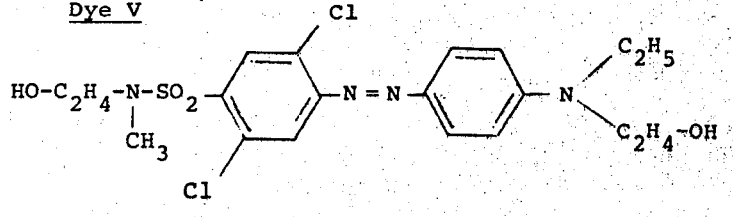

Dye VI

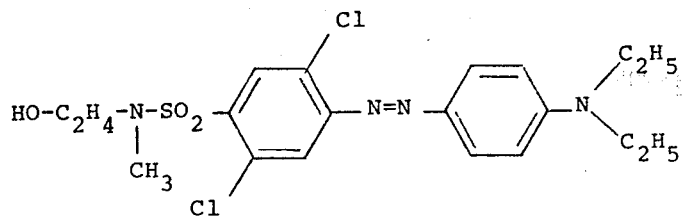

Dye VII

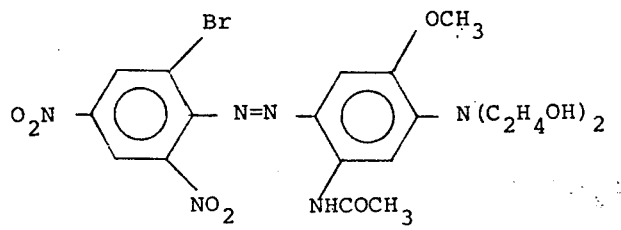

Dye VIII

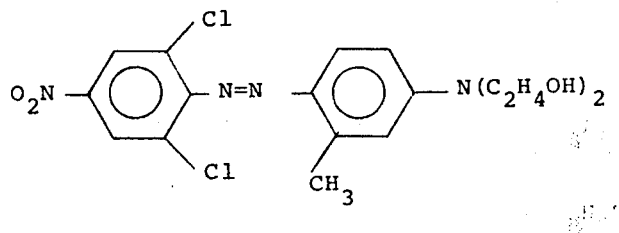

EXAMPLE 1

Reaction mixture:

482,5 g of hexanediolpolycarbonate (molecular weight 2050)
76.0 g of 1,6-diisocyanatohexane
3.4 g of Dye I
69.5 g of acetone
4.0 g of N-methyldiethanolamine
3.1 ml of dimethylsulphate The hexanediol polycarbonate is dehydrated for 20 minutes in a water jet vacuum (14 Torr) at 125°C and mixed with the dye at 120°C. The mixture is stirred for 10 minutes. 1,6-Diisocyanate is then added at 100°C and the mixture is kept at 100°C for 1 hour. It is then cooled to 60°C, N-methyl-diethanolamine and 169.5 g of acetone are added and the temperature is kept at 60°C for 3 hours. Dimethylsulphate and 400 g of acetone are then added at 50°C and the mixture is stirred for a further 20 minutes.

737 g of a 50% solution in acetone of a prepolymer which has an NCO content of 1.1% are obtained. 743 g of the prepolymer are mixed with 165 g of normal propylene diamine solution and 578 g of salt-free water at about 45°C with vigorous stirring and the acetone is then distilled off in a stream of air or nitrogen at a bath temperature of 60° to 70°C. The residue is washed with water, passed through a 0.5 mm sieve, suction filtered and dried. A blue, very freely pourable thermoplastic polyurethane powder having a melting point of 135°C is obtained.

Yield: 370 g; lightfastness: 7-8 (according to DIN 54 004).

EXAMPLE 2

Example 1 is repeated with the modification that the dye is first "dissolved" in the diisocyanate and this "solution" is then added to the dehydrated polycarbonate at about 100°C. The procedure is otherwise completely analogous to that of Example 1. 365 g of blue polyurethane powder melting at 135°C are obtained.

EXAMPLE 3

Reaction mixture 482.5 g of hexanediolpolycarbonate (molecular weight 1940)
80.0 g of 1,6-diisocyanatohexane
6.8 g of Dye I
4.0 g of N-methyldiethanolamine and 170 g of acetone
3.1 ml of dimethylsulphate and 407 g of acetone.

The hexanediol polycarbonate is dehydrated at 125°C and 14 Torr for 20 minutes and the dye is then added at 110°C. The procedure is otherwise the same as described in Example 1. 1153 g of a 50% prepolymer solution in acetone (1.7% by weight of NCO) is obtained which is then diluted with a further quantity of acetone to an NCO content of 0.9% by weight. 746 g of this solution are mixed with 545 g of water and 160 g of a mixture of 9 parts by weight of 1-normal propylene diamine solution and 1 part of 1-normal diethylenetriamine solution. Working up of the reaction mixture analogously to Example 1 yields 255 g of a deep blue polyurethane powder melting at 95°C.

EXAMPLE 4

Reaction mixture:

475 g of a polyester of adipic acid and butanediol with a molecular weight of 2250,
16 g of Dye II
80 g of 1,6-diisocyanatohexane,
4 g of N-methyldiethanolamine and 179 g of acetone
3.1 ml of dimethylsulphate and 400 g of acetone.

The dye is added to the dehydrated polyester at 112°C and the procedure as in Example 1 is then continued. 1157 g of a 50% solution of prepolymer in acetone are obtained (1.3% by weight NCO). 755 g of prepolymer are mixed with 190 g of 1-normal propylene diamine solution and 556 g of salt free water at about 45°C with vigorous stirring. The procedure is otherwise completely analogous to that of Example 1. 375 g of a scarlet red polyurethane powder having a melting point of 165°C and lightfastness of 6–7 (DIN 54 004) are obtained.

EXAMPLE 5

Reaction mixture:

710 g of a polyester of adipic acid and butanediol (molecular weight 2250)
24 g of Dye III
120 g of 1,6-diisocyanatohexane
6 g of N-methyldiethanolamine and 275 g of acetone
4.65 ml of dimethylsulphate and 590 g of acetone.

The dye is added to the dehydrated polyester at 112°C and the procedure as in Example 1 is then continued. 1720 g of a 50% solution of prepolymer in acetone are obtained (1.3% by weight NCO). 765 g of the prepolymer are mixed with 201 g of normal propylene diamine solution and 564 g of salt-free water at about 45°C with vigorous stirring. The procedure is otherwise completely analogous to that of Example 1 and 382 g of a brilliant red polyurethane powder melting at 110°C are obtained. Lightfastness: 8.

EXAMPLE 6

Reaction mixture:

965.0 g of hexanediol polycarbonate (molecular weight 2050)
6.8 g of Dye IV
151.0 g of 1,6-diisocyanatohexane
8.0 g of N-methyldiethanolamine and 275 g of acetone
6.2 ml of dimethylsulphate and 863 g of acetone.

The dye is stirred into the dehydrated hexanediol polycarbonate at 110°C. The procedure is otherwise completely analogous to that of Example 1. 2276 g of a 50% solution of prepolymer in acetone are obtained (1.06 % by weight of NCO). 738 of prepolymer are mixed with 130g of normal propylene diamine solution and 608 g of salt-free water. The procedure is then continued analogously to Example 1. 369 g of a polyurethane powder having a melting point of 138°C are obtained. The powder is lemon yellow. Lightfastness: 7–8.

EXAMPLE 7

The reaction mixture is the same as in Example 6 except that 6.7 g of Dye V are used. The dye is dissolved in 1,6-diisocyanatohexane and this solution is added to hexanediol polycarbonate at 100°C. The subsequent procedure is analogous to that in Example 1. 2276 g of a 50% solution of a prepolymer in acetone having an NCO content of 1.1% by weight are obtained.

739 g of the prepolymer solution are mixed with 164 g of normal propylene diamine solution and 575 g of salt-free water. The procedure is then continued analogously to Example 1. 370 g of a vermilion red polyurethane powder melting at 158°C are obtained. Lightfastness: 7–8.

EXAMPLE 8

The reaction mixture is the same as in Example 6 except that 6.7 g of Dye VI are used. The dye is dissolved in 1,6-diisocyanatohexane and added to hexanediol polycarbonate at 100°C. The subsequent procedure is analogous to that in Example 1. 2280 g of a 50% prepolymer solution in acetone with an NCO content of 1.14% by weight are obtained. 736 g of the prepolymer are mixed with 170 g of normal propylenediamine solution and 566 g of salt-free water. The subsequent procedure is analogous to that of Example 6. 368 g of a vermilion red polyurethane powder melting at 155°C are obtained. Lightfastness: 6–7

EXAMPLE 9

Reaction mixture:

950.0 g of a polyester of adipic acid and butanediol (molecular weight 2000)
5.0 g of Dye VII
160.0 g of 1,6-diisocyanatohexane
342.0 g of N-methyl-diethanolamine
6.2 ml of dimethylsulphate and 800 g of acetone.

The polyester is dehydrated at 130°C and 14 Torr for 20 minutes, the solution of the dye in the diisocyanate is added at 100°C and the mixture is kept at 100°C for 1 hour. After cooling to 60°C, N-methyl-diethanolamine and 342 g of acetone are stirred in and the reaction mixture is then kept at 55–60°C for 3 hours. Dimethylsulphate and 800 g of acetone are then added at 50°C and the reaction mixture is stirred for a further 20 minutes. 2273 g of a 50% prepolymer solution in acetone having an NCO content of about 1.5% are obtained. 752 g of the prepolymer are mixed with 228 g of normal propylenediamine solution and 524 g of salt-free water at about 45°C with vigorous stirring. The acetone is distilled off in an air stream (or stream of nitrogen) at a bath temperature of 60°C and the residue is washed with water, passed through a sieve having a 0.5 mm mesh, suction filtered and dried. 375 g of brown polyurethane powder having a melting point of 180°C are obtained.

EXAMPLE 10

Reaction mixture:

950.0 g of a polyester of adipic acid and butanediol (molecular weight 2000)
5.0 g of Dye VIII
160.0 g of 1,6-diisocyanatohexane
342.0 g of acetone
8.0 g of N-methyl-diethanolamine
6.2 ml of dimethylsulphate and 800 g of acetone.

The procedure is completely analogous to that of Example 9. 2273 g of a 50% prepolymer solution in acetone having an NCO content of about 1.5% are obtained. 764 g of the prepolymer are mixed with 232 g of normal propylene diamine solution. 532 g of salt-free water at about 45°C with vigorous stirring. The procedure is otherwise the same as described in Example 9. 382 g of a brownish red polyurethane powder having a melting point of 190°C are obtained.

EXAMPLE 11

Preparation of a colorless polyurethane powder

A prepolymer is prepared by reacting 950 g of a dehydrated polyester of butanediol and adipic acid which has an average molecular weight of 2190 with 166 g of 1,6-hexane-diisocyanate and 8.8 g of N-methyl-diethanolamine for one hour at 100°C. 6.8 cc of dimethylsulphate and a total of 1280 g of of acetone are added to the prepolymer. A 50% solution of the prepolymer in acetone with an NCO content of 1.23% is obtained.

A polyurethane urea suspension is formed when 757 parts of this prepolymer are mixed with 189 parts of a 1-normal aqueous propylene-1,2-diamine solution and 568 g of water. After removal of the acetone by distillation, filtration, washing and then drying, a polyurethaneurea powder melting at 168°–174° is obtained.

The powder consists of spherical particles with an average diameter of 60 $\mu$ and has a current flow resistance of $10^{12}$ Ohm.cm.

100 g of this colorless powder and 5 g of the colored powder from Example 4 are vigorously mixed by a mechanical mixing process and then applied to a separating support by means of a doctor knife. The layer is sintered at 155°C for 2 minutes. A homogeneous, intensely red transparent sheet is obtained. The lightfastness of the sheet tested by the Xeno test is 6 (DIN 54 004).

EXAMPLE 12

100 g of the colorless powder from Example 11,
5 g of the colored powder from Example 4 and
2 g of $TiO_2$
are vigorously mixed mechanically and then sintered as in Example 11. A red, but not longer transparent, homogeneous sheet is obtained. Its lightfastness is also 6.

EXAMPLE 13

The colored powder from Example 4 is applied as a pure substance and sintered as described in Example 11. A homogeneous sheet is obtained in which the color of the product is completely preserved.

EXAMPLE 14

The following components are vigorously mixed:
a. 100 g of the colorless powder from Example 11 and 5 g of the colored powder from Example 4
b. 100 g of the colorless powder from Example 11 and 2 g of carbon black
c. 100 g of colorless powder from Example 11 and 2 g of aluminum bronze.

Mixtures a, b and c are applied alternately in a deliberate rhythm to a separating support using transverse motion nozzles and then calibrated with a fixed doctor knife to form a film of uniform thickness. The film is then sintered as described in Example 11. A sheet with an irregular colored pattern is obtained.

EXAMPLE 15

The procedure is the same as described in Example 14 except that the powders, although spread coated to form a layer, are not calibrated to form a film of uniform thickness. A sheet with a colored pattern and irregular surface is obtained.

EXAMPLE 16

100 g of the colorless powder from Example 11 are homogeneously mixed with
a. 5 g of the colored powder from Example 1 or
b. 5 g of the colored powder from Example 5 or
c. 5 g of the colored powder from Example 6, respectively The mixtures are applied separately through screen printing stencils to a steel sheet heated to 95°C, and then sintered as described in Example 1. Colored patterned sheets are obtained which may be applied to a permanent support by laminating.

EXAMPLE 17

10 g of the colored powder from Example 4 are sprinkled into 100 g of a 25% solution of a one component polyurethane of:
100 parts of polyester of butanediol and adipic acid (molecular weight 2250),
9.5 parts of butane-1,4-diol and
37.5 parts of 4,4'-diphenylmethanediisocyanate
in a mixture of dimethylformamide and methylethylketone (proportions by weight 3:2) and uniformly distributed therein by vigorous stirring. A transparent, homogeneously colored paste is obtained which is eminently suitable for coating substrates such as textiles or leather.

What is claimed is:

1. In a process of producing direct or reverse coatings on substrates by the dry knife coating or screening process, the improvement wherein the coating material comprises thermoplastic polyurea powders characterized by
   a. a smooth, substantially spherical or lenticular surface,
   b. an average particle diameter of 5 to 1000 $\mu$,
   c. a urea group content of from 8 to 30 percent by weight,
   d. an ionic group content of 0.01 to 0.15 milliequivalents per gram, said ionic group capable of salt formation, and
   e. from 0.1 to 10 percent by weight of an organic dye built into the polymer molecule by way of at least one urethane and/or urea group.

2. The process of claim 1, wherein the average particle diameter is from 10 to 200 $\mu$, the ionic group content is from 0.02 to 0.1 milliequivalents per gram, and said organic dye comprises from 0.2 to 5 percent by weight.

3. The process of claim 1, wherein said colored powder is further characterized by:
   f. a melting range of from 110° to 250°C, and
   g. an Intrinsic-Melt-Index-Curve resembling the ascending branch of a parabola and varying from 2 grams per 10 minutes to 50 grams per 10 minutes within a temperature interval of from 5° to 50°C.

4. In a process of coloring uncolored poly(urethane) urea powders, aqueous polyurethane suspensions and one-component polyurethanes which are dissolved in organic solvents by adding colorants thereto, the improvement wherein said colorant comprises thermoplastic polyurea powders characterized by
   a. smooth, substantially spherical or lenticular surface,
   b. an average particle diameter of 5 to 1000 $\mu$,
   c. a urea group content of from 8 to 30 percent by weight,
   d. an ionic group content of 0.01 to 0.15 milliequivalents per gram, said ionic group capable of salt formation, and
   e. from 0.1 to 10 percent of an organic dye built into the polymer molecule by way of at least one urethane and/or urea group.

5. The process of claim 4, wherein the average particle diameter is from 10 to 200 $\mu$, the ionic group content is from 0.02 to 0.1 milliequivalents per gram, and said organic dye comprises from 0.2 to 5 percent by weight.

* * * * *